United States Patent [19]

Grabowski

[11] Patent Number: 4,676,187
[45] Date of Patent: Jun. 30, 1987

[54] TABLET COATING APPARATUS

[75] Inventor: Albert T. Grabowski, Dover, N.J.

[73] Assignee: Warner-Lambert Company, Morris Plains, N.J.

[21] Appl. No.: 821,922

[22] Filed: Jan. 22, 1986

[51] Int. Cl.⁴ .............................................. B05C 19/00
[52] U.S. Cl. ........................................ 118/19; 68/143; 118/418
[58] Field of Search ........................... 118/19, 20, 418; 68/143, 145

[56] References Cited

U.S. PATENT DOCUMENTS

| | | | |
|---|---|---|---|
| 1,563,552 | 12/1925 | Butzbach | 68/143 |
| 2,070,192 | 2/1937 | Zarafu | 68/143 X |
| 2,274,121 | 2/1942 | Bendex | 68/143 |
| 3,601,086 | 8/1971 | Hostetler | 118/19 |

Primary Examiner—John P. McIntosh
Attorney, Agent, or Firm—Ronald A. Daignault

[57] ABSTRACT

Apparatus for coating pharmaceutical tablets in which a drum having a perforated periphery is provided with an adjustable insert which divides the drum into an inactive zone and a coating zone, thus permitting a relatively small quantity of tablets to be coated under conditions equivalent to those used for coating a bed of particles in a completely loaded drum.

6 Claims, 4 Drawing Figures

4,676,187

TABLET COATING APPARATUS

DESCRIPTION

1. Technical Field

This invention relates to apparatus for coating pharmaceutical tablets and, more specifically, to apparatus for tumbling a bed of tablets in the presence of a coating material.

2. Background Art

Pharmaceuticals in the form of tablets are coated with various materials for a variety of reasons including to mask a taste, to protect components from oxidation by the air, and to control the site and/or the rate of release of a drug. The great variety of pharmaceuticals which are prepared in tablet form, and the various reasons for using a coating material have led to the need for a variety of coating substances and a variety of coating processes. New processes require experiments to establish the coating conditions.

One limiting factor in product development is the relatively small amounts of chemical compounds which are typically available for testing. The production models of tablet coating machines have a high working capacity and, if used to test a coating process, these machines must be operated at capacity in order to obtain data which is representative of actual working conditions. For example, a working capacity of about 400 pounds is typical for some production models, and even semi-production models have a working capacity as great as about 40 pounds. Merely scaling down production equipment to laboratory size equipment which may be able to handle several pounds of tablets is not generally possible since the size per se of equipment may influence particle interactions. For example, decreasing the size of the apparatus also decreases the depth of the bed of tablets, and the friction between the particles and the drum wall. These changes in conditions may have enough of an effect on the movement of the particles to be coated to require changes in the conditions required for coating.

Apparatus which is capable of simulating the coating behavior of production size equipment and yet permits the use of a relatively small amount of material to be coated is desirable in order to determine coating conditions for production size equipment based on laboratory-scale experiments.

SUMMARY OF THE INVENTION

It is accordingly one object of this invention to provide improved apparatus for coating tablets using relatively small quantities of tablets.

In accordance with this invention there has been provided apparatus for coating pharmaceutical tablets comprising a coating drum adapted to contain a bed of tablets within a coating zone. The drum has a substantially horizontal axis of rotation, a perforated peripheral surface, and outwardly tapered side wall portions contiguous to the peripheral surface of the drum. The sidewall portions define an opening for access to the interior of the drum. Adjustable partition means, vertically mounted within the drum, separate the coating zone into at least two axially spaced zones. The partition means comprises a plurality of sections assembled into a partition member. Means is provided to interconnect the perimeter of the partition with the peripheral surface of the drum.

The adjustable insert in the coating drum permits a decrease in the batch size of tablets to be coated while retaining the coating conditions that would exist when coating without the adjustable insert. The axial adjustability of the portion of the insert permits a gradual increase or decrease in batch sizes without a detrimental effect to the coating process.

BEST AND VARIOUS MODES FOR CARRYING OUT THE INVENTION

The present invention is concerned with apparatus comprising an axially adjustable partition in a rotatable coating drum having a perforated peripheral surface. While it is contemplated that the adjustable partition can be used a variety of drums having a perforated peripheral surface, it has been found to be especially useful with such a drum having means for introducing coating material and air into the drum so that the mixture of air and the coating material is drawn downwardly through the bed of particles in the drum and exhausted through perforations in the bottom part of the drum. Such a system is shown and described in U.S. Pat. No. 3,601,086 to Hostetler for "Tablet Coating Apparatus", disclosure of which is incorporated herein by reference.

Coating drums in a variety of sizes may be used in practicing the invention, such as, for example, semiproduction models having a working capacity of at least 40 pounds, as well as production models having a working capacity of 400 pounds or above. For example, the adjustable partition allows a decrease in batch size in a semi-production model from about 40 pounds down to about 2 pounds.

Figure 1:
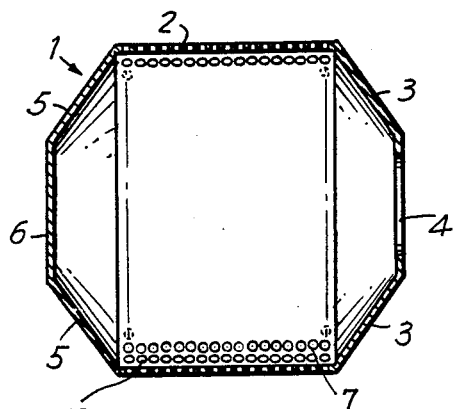
FIG. 1 is a vertical sectional view of a drum showing the perforated peripheral surface.

Referring to the drawings, in FIG. 1 coating drum 1 comprises perforated cylindrical peripheral surface 2 having annular side wall portions 3 and 5. Side wall 3 defines a wide opening 4 for introducing tablets and coating material into drum 1. Side wall 5, together with circular plate 6, encloses one end of the drum 1 which may be rotated by means (not shown) affixed to plate 6 and may be supported by rollers (not shown) at the lower portion of the drum.

Figure 2:
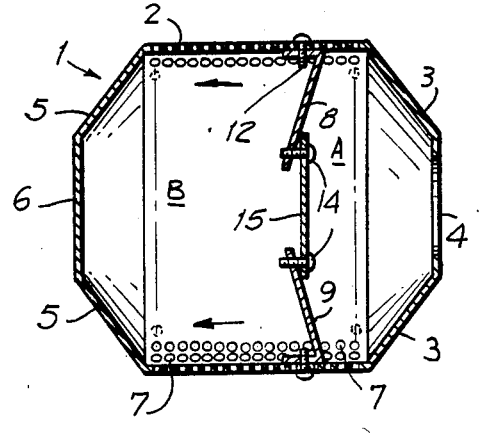
FIG. 2 is a cross-sectional view of the drum of FIG. 1 with the adjustable partition in position within the drum.

FIG. 2 shows an adjustable partition fastened in place by bolts extending through the perforations in the coating drum and dividing the drum into inactive zone B and coating zone A. Circular disk 15 interconnects truncated sectors 8 and 9 with bolts 14 and the truncated sectors in turn are secured to the perforated peripheral surface 2 of drum 10 by bolts 12 passing through perforations in the peripheral surface 2 and tabs 11 which are affixed to sectors 8, 9 and 10.

Figure 3:
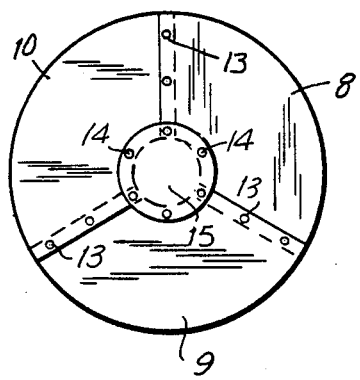
FIG. 3 is a front view of the adjustable partition.
Figure 4:
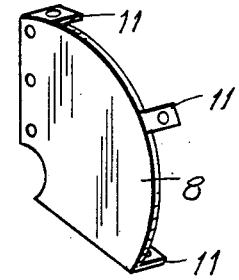
FIG. 4 is an isometric view of one sector of the adjustable partition.

FIG. 3 is a plan view of an assembly comprising three sectors 8, 9 and 10. FIG. 4 shows more detail of tabs 11 for securing sector 8, which is representative of the three sectors, to the peripheral surface of the drum.

The various components of the adjustable partition are sized so that they can readily be inserted into the interior of drum 1 through mouth opening 4 which is defined by annular side wall portions 3. The adjustable portion may suitably be formed from two, three, four or even more sectors. However, for ease of assembly, an adjustable partition consisting of three sectors bolted to a center circular disk as shown in the drawings is preferred.

The construction of the partition in combination with the multiplicity of perforations in the periphery of the drum provides a high degree of axial adjustability of the partition within the drum. The partition is thus easily adjusted to vary the bed shape to accommodate the quantity of tablets which is available for a test.

In carrying out a coating process using the apparatus shown in the Figures, the tablets to be coated are inserted through opening 4 into zone A, coating material is also introduced into zone A through opening 15 by means well-known and conventional in the art, and air and coating material is exhausted through the perforations in the periphery of zone A by means (not shown) which are well-known in the art.

What is claimed is:

1. Apparatus for coating pharmaceutical tablets comprising:

a coating drum adapted to contain a bed of tablets within a coating zone, said drum having a substantially horizontal axis of rotation, a perforated peripheral surface and outwardly tapered side wall portions contiguous to said peripheral surface of said drum, said side wall portions defining an opening for access to the interior of said drum;

adjustable partition means vertically mounted within said drum separating the coating zone into at least two axially-spaced zones, said partition means comprising a plurality of sections wherein said partition means comprises a central circular disk, a plurality of truncated sectors removable affixed to each other at their radially extending edges, and removably affixed to the periphery of said central circular disk, and means at the periphery of said truncated sectors for removably connecting said truncated sectors to the perforated outer surface of said drum; and, means interconnecting the perimeter of said partition with the peripheral surface of said drum.

2. The apparatus of claim 1 wherein said sections comprise sectors of a circle.

3. The apparatus of claim 1 wherein said sections comprise truncated sectors of a circle.

4. The apparatus of claim 1 wherein said partition means is interconnected with the peripheral surface of the drum by means extending through perforations in the peripheral surface of said drum.

5. The apparatus of claim 1 wherein said partition means consists of from 2 to 4 truncated sectors affixed to the periphery of the central circular disk.

6. The apparatus of claim 1 wherein the truncated sectors are affixed to the central disk by bolts and the outer periphery of the truncated sectors are affixed to the peripheral surface of the drum by bolts extending through perforations in the peripheral surface.

* * * * *